United States Patent [19]

Kim

[11] Patent Number: 5,444,261
[45] Date of Patent: Aug. 22, 1995

[54] FAR INFRARED EMITTING IMAGE DISPLAY DEVICE

[75] Inventor: Heon-soo Kim, Seoul, Rep. of Korea

[73] Assignee: Samsung Electron Devices Co., Ltd., Kyungki-do, Rep. of Korea

[21] Appl. No.: 2,162

[22] Filed: Jan. 7, 1993

[30] Foreign Application Priority Data

Jun. 9, 1992 [KR] Rep. of Korea ............... 92-9990
Jun. 9, 1992 [KR] Rep. of Korea ............... 92-9991
Jun. 9, 1992 [KR] Rep. of Korea ............... 92-9995

[51] Int. Cl.[6] .............................. G21G 4/00
[52] U.S. Cl. .......................... 250/493.1; 250/504 R
[58] Field of Search ................ 250/493.1, 504 R

[56] References Cited

U.S. PATENT DOCUMENTS

| | | | |
|---|---|---|---|
| 3,585,390 | 6/1971 | Ishikawa | 250/504 |
| 3,949,231 | 4/1976 | Blunck et al. | 250/493.1 |
| 4,377,618 | 3/1983 | Ikeda | 428/697 |
| 4,542,299 | 9/1985 | Scholz et al. | 250/493.1 |
| 4,886,972 | 12/1989 | Nakai et al. | 250/504 R |
| 4,999,502 | 3/1991 | Midavaime | 250/493.1 |
| 5,012,112 | 4/1991 | Flint et al. | 250/493.1 |

*Primary Examiner*—Bruce C. Anderson
*Attorney, Agent, or Firm*—Leydig, Voit & Mayer

[57] ABSTRACT

A housing for an image display device and an image display device are provided which include a cabinet having an opening for viewing an electronic information display accommodated in the cabinet, wherein at least a portion of the cabinet is formed from a mixture of raw material and at least one far infrared emitting material in an amount of 1 to 30%, by weight. An image display device and a housing for an image display device are also provided which include an electronic information display and at least one far infrared lamp at the front-side of a cabinet containing the electronic information display. Additionally provided is an image display device comprising at least one far infrared emitting device containing a heater to apply heat to a far infrared emitting material, a reflecting plate to reflect far infrared radiation which is outwardly emitted from the interior of the far infrared emitting device, and a supporting means for supporting at least one far infrared emitting device and the reflecting plate.

19 Claims, 10 Drawing Sheets

FAR INFRARED EMITTING IMAGE DISPLAY DEVICE

BACKGROUND OF THE INVENTION

The present invention is directed to a far infrared emitting image display device, and particularly to a far infrared emitting image display device manufactured by including far infrared emitting material in a cabinet for an image display device or attaching a far infrared emitting body to the cabinet to emit far infrared.

In the present society, that is, in an information-oriented society, the completion of a transmission system using image display information is one of the symbol of modern world. However, the image display device leads to mis-operation of the device and can injure an operator's health owing to the electromagnetic wave emitted from the device, and this results, in an the exchange of health for convenience. The effect on the human body is called a VDT (visual display terminal) syndrome and the symptoms are eye fatigue, ocular pain, impairment of eyesight, headache, chronic fatigue, etc. In order to remove and/or shield these harmful electromagnetic waves, efforts such as the use of an antistatic treatment, establishment of a filter, establishing a magnetic field generator, etc. were tried, but an economic burden and question on the effect still remain, and now it is approved that complete removal and/or shielding of electromagnetic wave is impossible.

Far infrared rays are electromagnetic waves in the range of 5 to 1000 $\mu$m (The standard wavelength region of the far infrared rays are not critically defined. This range is selected to exclude near infrared rays in the present invention.) and affect the human body in two forms: thermal and non-thermal effects. The thermal effect is the effect of the thermal energy in the peripheral vein absorbed from the skin to the deep tissue or to the whole body, and the non-thermal effect of the photon which corresponds to far infrared radiation of a specific wavelength is stimulating the receptor in the endothelia or cell membranes. This means that far infrared radiation of a specific wavelength transmits to and activates the cell. Therefore, far infrared rays act as a thermal energy source through a thermal reaction, and as a photon source through a non-thermal reaction. In conclusion, far infrared radiation shows direct thermal action as an infrared, indirect action through activation of water molecules, and non-thermal action of stimulating receptors of nerve cells located 100 $\mu$m below the skin which perceive heat, cold, pain, etc. Through these actions, acceleration of blood circulation and fast release of effetiveness are achieved.

Far infrared, especially in the 5.5 to 15 $\mu$m region, is used as an energy source which causes stretching and bending of bonds in water molecules, and when energy in the far infrared region is emitted and absorbed by the human body, plants, and animals, water molecules which compose most of such living bodies are activated and this results in acceleration of blood circulation, shortening of recovery of health and food cooking time, acceleration of flower blooming, extension of the flower life, etc. (See Japan *Illumination Society* Vol.72 No.12 1988, p717 "Application of far infrared to the human body", ibid Vol.74 No.12 1990, p796 "The present state of applying far infrared to the food industry and the future", Japan ceramics Vol.23 No.4 1988, p310 "Far infrared emitting materials and its application", published by Seoul Korean Tourist Information Co. & translated by W. S. Park "Far Infrared")

A lot of research and development has been committed to the above-mentioned, beneficial far infrared. Japanese Patent Laid-Open Publication No. Sho 63-198254, Sho 63-236284, Sho 63-248051, Hei 1-65786, Hei 1-77893 and Hei 1-169865 disclose techniques concerning the manufacture of a far infrared emitting lamp. Many applications employing these far infrared emitting lamps are also known. Japanese Patent Laid-Open Publication No. hei 2-57883 and hei 2-309169 to Hitachi disclose refrigerators employing the far infrared emitting lamp, Japanese Patent Laid-Open Publication No. hei 2-306028 of Rinai discloses a microwave oven employing the far infrared emitting lamp, and Japanese Patent Laid-Open Publication No. hei 2-164365 discloses a bathtub employing far infrared emitting lamps. In all of these publications, effects obtained by employing the far infrared emitting lamps are also disclosed together with various experimental data, and the results are satisfying.

Figure 1:
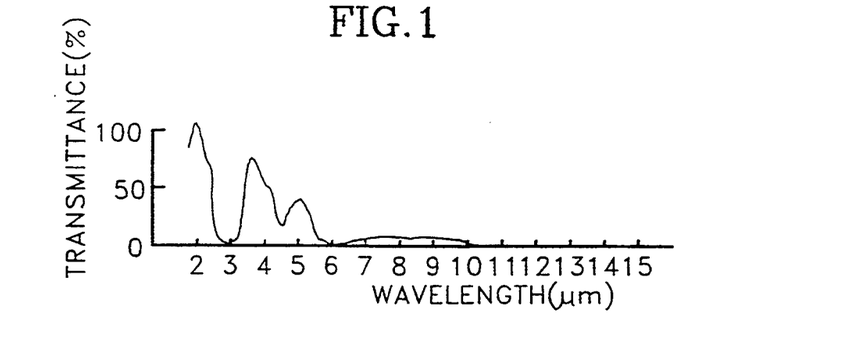
FIG. 1 is a graph illustrating the transmittance of water versus wavelength.

Water composes most of the human body and shows the following relation to the far infrared. FIG. 1 is a graph illustrating the transmittance of water with respect wavelength. As shown in this figure, water has the characteristic of absorbing light near the 3 $\mu$m and 6 $\mu$m regions and above. Since, O—H bond between oxygen and hydrogen in the water molecule ($H_2O$, H—O—H), has a stretching vibration at 2.5 to 3.5 $\mu$m, and a bending vibration at 10 to 14 $\mu$m, water absorbs light when exposed to the light in these regions, and the vibration of the water molecule is accelerated. That is to say, water molecules become activated and then reorient themselves to form an ideal structure when the light in this region is supplied from the outside.

The wavelength of a human body can be calculated by taking body temperature as an example, in accordance with the relation between absolute temperature and wavelength, as in the Wien formula defined as: $\delta = 2897/T$ (where T denotes an absolute temperature and $\delta$ denotes a wavelength $\mu$m.) Namely, when 309.5 (273+36.5) is substituted for T, the wavelength becomes 9.36 $\mu$m which is within the far infrared range.

Figure 2A:
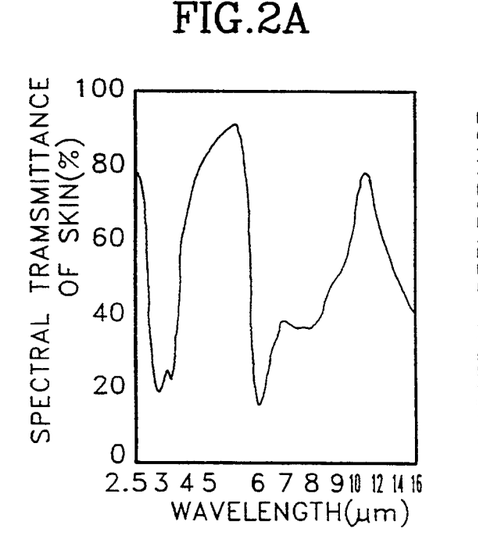
FIGS. 2A and 2B are graphs showing spectral transmittance (2A) and spectral reflectance of skin (2B), versus wavelength.
Figure 2B:
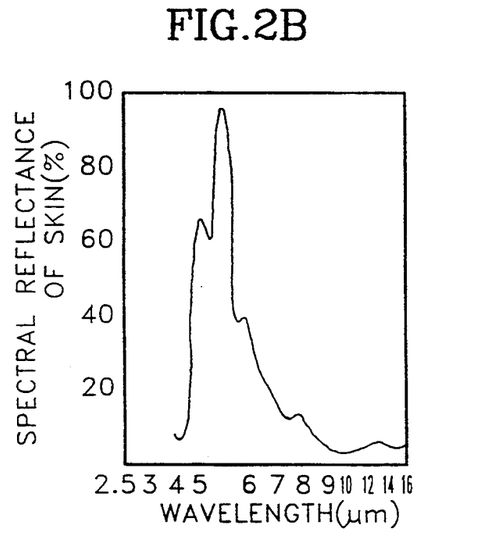

FIGS. 2A and 2B are graphical representations showing a spectral transmittance (2A) and a spectral reflectance (2B) of skin according to each wavelength, respectively. The far infrared emission from human skin is within the range of 3 to 50 $\mu$m, especially, the wavelengths within the range of 8 to 14 $\mu$m occupies approximately 46% of the total emitted energy. The energy emitted to the skin is transmitted, reflected or absorbed, and therefore, the amount of the energy absorbed by the skin can be calculated considering FIGS. 2A and 2B. For example, most of the energy within 8 to 14 $\mu$m region of which transmittance and reflectance are low, are considered to be absorbed by the skin.

Thus, upon supplying energy in this range, a living body mostly consisting of water absorbs and uses this energy as kinetic energy and is easily activated. This gives the following effects of early blossom of flowers, period shortening and early maturation of a hatching egg, prolonging cut flowers' life, etc. To the human body, the effect appears micro massage effect, acceleration of perspiration and excretion, fast health recovery, etc.

Far infrared emitting materials are as follows: alumino-silicates ($Al_2O_3$-$SiO_2$), cordierites (MgO-$Al_2O_3$-$SiO_2$), zircons ($ZrO_2$-$SiO_2$), carbonation, ferric oxide ($Fe_2O_3$), manganese dioxide ($MnO_2$), cupric oxide (CuO), tricobalt tetroxide ($Co_3O_4$), nickel monoxide (NiO), chromic oxide ($Cr_2O_3$), lithium oxide ($Li_2O$), zinc oxide (ZnO), bismuth oxide ($Bi_2O_3$), barium oxide (BaO), titanium oxide ($TiO_2$), boron oxide ($B_2O_3$), sodium oxide ($Na_2O$), potassium oxide ($K_2O$), phosphorus pentoxide ($P_2O_5$), molybdenum sesquioxide ($Mo_2O_3$), calcium oxide (CaO), etc.

Figure 3:
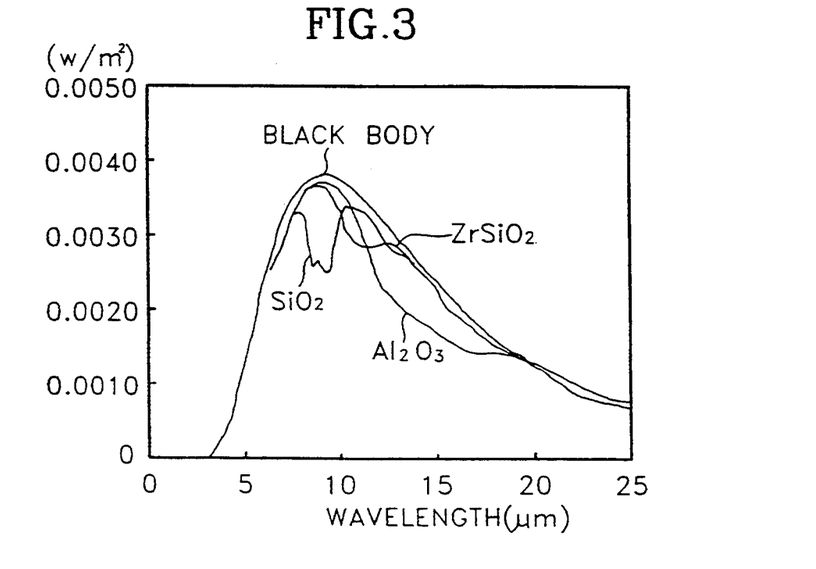
FIG. 3 is a graph showing emission intensity versus wavelength for various far infrared emitting materials with relation to that of the black body.

FIG. 3 is graphical representation of the intensity emission with respect wavelength for several far infrared emitting materials with relation to that of a black body (measured at 40° C.). The materials emit far infrared in 5 to 25 μm wavelength region.

Figure 4A:
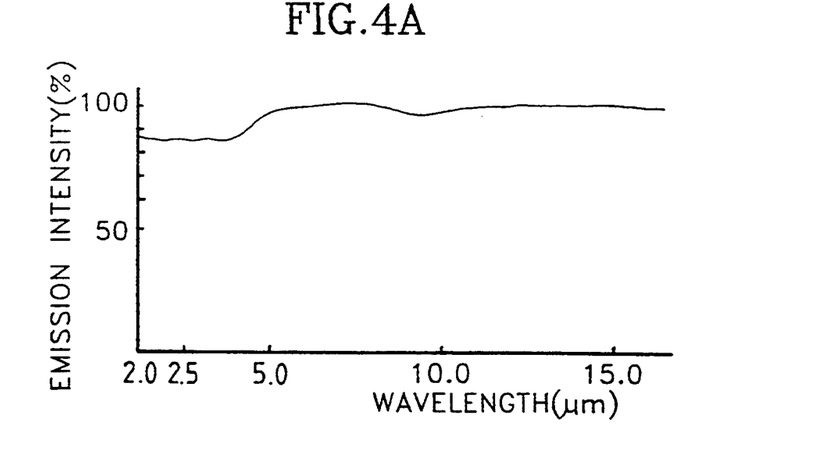
FIGS. 4A, 4B and 4C are graphs showing emission intensity versus wavelength for various far infrared emitting mixtures.
Figure 4B:
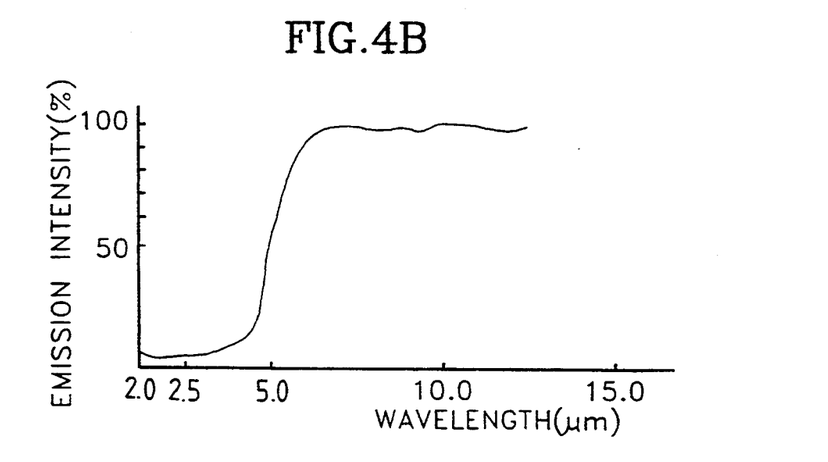
Figure 4C:
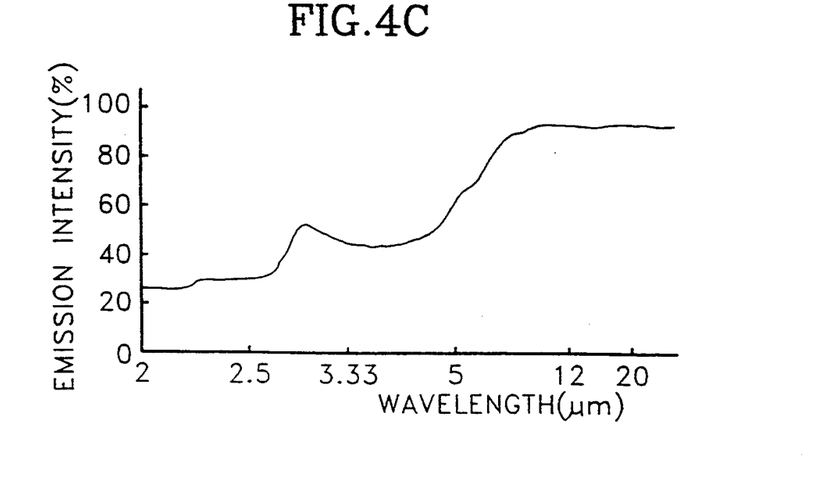

FIGS. 4A, 4B and 4C are graphical representation of the intensity of emission with respect to wavelength for several far infrared emitting mixtures, respectively. FIG. 4A corresponds to the mixture of 60 wt % of $SiO_2$, 20 wt % of $Al_2O_3$, 5 wt % of $Fe_2O_3$ and 15 wt % of $TiO_2.MnO.CaO.MgO$, FIG. 4B corresponds to the mixture of 50 wt % of $ZrO_2$, 30 wt % of $SiO_2$, 8 wt % of $Al_2O_3$, 3 wt % of $Fe_2O_3$, 3 wt % of BaO, 2 wt % of MgO and 4 wt % of CaO, and FIG. 4C corresponds to the mixture of 50 wt % of $SiO_2$, 45 wt % of $Al_2O_3$, 3 wt % of $K_2O$ and 2 wt % of $Na_2O$. From the figures, it is shown that each material emits far infrared at each specific wavelength region. Therefore, appropriate materials can be optionally used as occasion demands.

A cabinet, or case, which is a part of an image display device and exposed to view, is a supporting means carrying interior parts of the device. The cabinet is generally manufactured from engineering plastics and especially from ABS resin, vinyl chloride resin and acryl resin. The cabinet is manufactured by mixing raw resin, pigment, stabilizer, etc., and injecting the mixture into a catapult and then injection molding the mixture.

The cabinet is most widely manufactured from ABS resin. The ABS resin is a kind of plastic composed of styrene, acrylonitrile and butadiene, and is good with respect to impact-resistance and heat-resistance (heat-resisting temperature is 93° C.). Table 1 illustrates heat-deformation temperatures for several cabinet-molding materials.

TABLE 1

| | samples | heat-deformation temperature (°C.) |
|---|---|---|
| thermo-plastic resins | methacrylates | 65–100 |
| | vinyl chlorides | 50–75 |
| | poly vinyl alcohols | 45–75 |
| | nylons | −180 |
| | fluorides | 120 |
| | celluloides | 50–70 |
| | celluloses | 70–110 |
| | styrenes | 70–115 |
| | polyethylenes | 40–80 |
| | polypropylenes | 80–100 |
| | polycarbonates | 130 |
| thermo-setting resins | phenol resins | 70–120 |
| | urinous resins | 100–130 |
| | melamine resins | 150–200 |
| | unsaturated polyester | −200 |
| | alkyd resins | 80–90 |
| | silicones | >250 |
| | foaming polyurethans | −100 |
| | polyethylenes | 40–80 |

SUMMARY OF THE INVENTION

An object of the present invention is to provide a far infrared emitting image display device having various harmful factors, which can reduce the user's uneasiness and economic burden and give a pleasant working environment.

To accomplish the above-mentioned object, there is provided in the present invention a far infrared emitting, image display device comprising a cabinet for supporting and containing interior parts of the device, characterized in that the cabinet contains at least one member selected from the group consisting of far infrared emitting materials, far infrared lamps and far infrared emitting devices, and so the image display device emits far infrared radiation.

The far infrared emitting materials can be contained in the cabinet through adding 1 to 30 wt % of the far infrared emitting materials into the raw materials for manufacturing the cabinet and then injection molding, or through coating the far infrared emitting material with a binder or a pigment on the surface of the cabinet.

The above-mentioned object of the present invention can also be accomplished by a far infrared emitting, image display device comprising at least one far infrared emitting device containing a heating means to apply heat to a far infrared emitting material, a reflecting plate to reflect far infrared radiation which is emitted outwardly from the interior of said device, and a supporting means including these objects.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

The above objects and other advantages of the present invention will become more apparent by describing in detail a preferred embodiment thereof with reference to the attached drawings in which:

FIGS. 13A and 13B illustrate the basic structure of a far infrared emitting device according to the present invention, in which

DETAILED DESCRIPTION OF THE INVENTION

The preferred embodiments of the present invention will be described in detail below. The method for manufacturing far infrared emitting, image display devices of the present invention will be explained in examples and the effect of the far infrared emitting, image display devices of the present invention will be explained in experiments.

As the first embodiment of the present invention, there is provided a far infrared emitting image display device comprising a cabinet for supporting and containing interior parts of the device, characterized in that the cabinet comprises far infrared emitting materials.

The far infrared emitting materials can be contained in the cabinet or coated on the surface of the cabinet.

In case of containing the far infrared emitting materials in the cabinet by mixing the materials with the raw materials for manufacturing the cabinet and then molding the mixture, the amount of the far infrared emitting materials added ranges from 1 to 30 wt % based on the total amount of the raw materials for manufacturing the cabinet. If the amount added is less than 1 wt %, only a scant far infrared emitting effect is obtained and if the amount added is more than 30 wt %, the impact-resistance of the obtained cabinet is too weak and formation of the cabinet becomes difficult. The preferred amount ranges from 5 to 15 wt %.

The preferred material which emits far infrared is at least one selected from the group consisting of aluminium oxide ($Al_2O_3$), silicon dioxide ($SiO_2$), magnesium oxide (MgO), zirconium oxide ($ZrO_2$), carbons, ferric oxide ($Fe_2O_3$), manganese dioxide ($MnO_2$), manganese monoxide (MnO), cupric oxide (CuO), tricobalt tetroxide ($Co_3O_4$), nickel monoxide (NiO), chromic oxide ($Cr_2O_3$), titanium oxide ($TiO_2$), boron oxide ($B_2O_3$), sodium oxide ($Na_2O$), potassium oxide ($K_2O$), molybdenum sesquioxide ($Mo_2O_3$), calcium oxide (CaO), zinc oxide (ZnO), lithium oxide ($Li_2O$), bismuth oxide ($Bi_2O_3$), phosphorous pentoxide ($P_2O_5$), barium oxide (BaO) and a complex thereof.

When a household television set, computer monitor, etc. operates, the temperature in the cabinet reaches to about 40° to 70° C., and so the far infrared emitting materials contained in the cabinet emit more far infrared radiation.

Figure 5A:
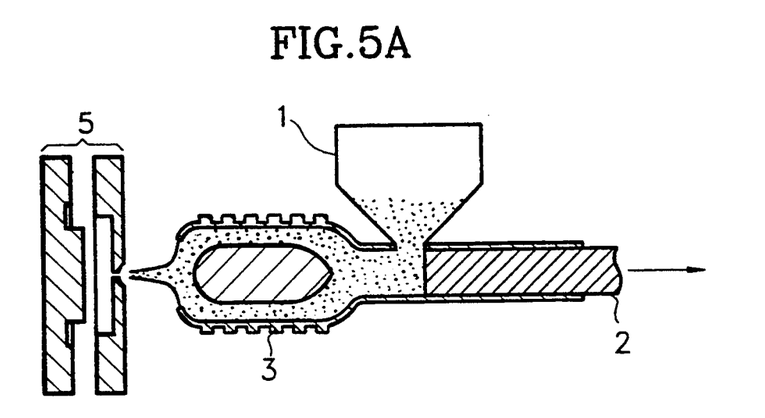
FIGS. 5A and 5B illustrate injection molding process for manufacturing a cabinet.
Figure 5B:
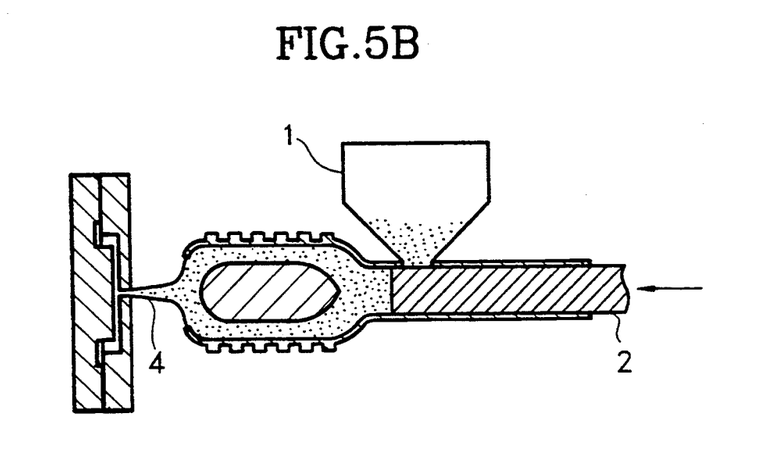

FIGS. 5A and 5B illustrate injection molding process for manufacturing a cabinet. Particularly, the cabinet is manufactured by putting the raw mixture materials in a hopper 1 and then spouting the mixture toward an outlet 4 by means of a piston 2, so that the mixture melts when passing a heating means 3 and then the melted mixture is molded into the predetermined shape of a cabinet in a troy 5.

EXAMPLE 1

70 wt % of $SiO_2$, 25 wt % of $Al_2O_3$, and 5 wt % of $Fe_2O_3$ are mixed to prepare a far infrared emitting ceramic. 15 wt % of the mixture is added and homogeneously dispersed into the raw materials for manufacturing an ABS cabinet. A cabinet for supporting and containing the parts of an image display device is manufactured through a common method, as shown in FIG. 5.

EXAMPLE 2

60 wt % of $ZrO_2$, 25 wt % of $SiO_2$, 5 wt % of $Al_2O_3$, 3 wt % of $Fe_2O_3$, 3 wt % of MgO and 4 wt % of $TiO_2$ are mixed to prepare a far infrared emitting ceramic. The procedure follows the same manner described in Example 1, except that the amount of the ceramic added is 10 wt % based on the amount of the raw materials for manufacturing an ABS cabinet.

EXPERIMENT 1

Figure 6:
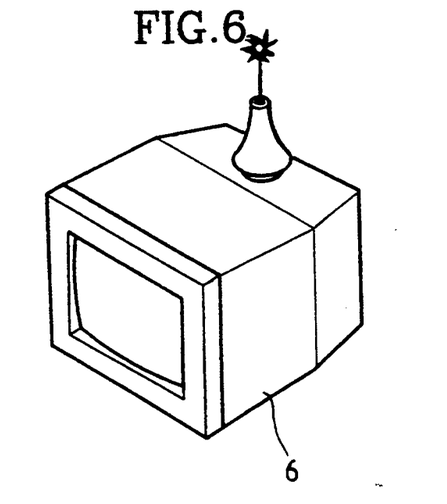
FIG. 6 is a drawing for explaining the method of experiment 1 of the present invention.
Figure 7A:
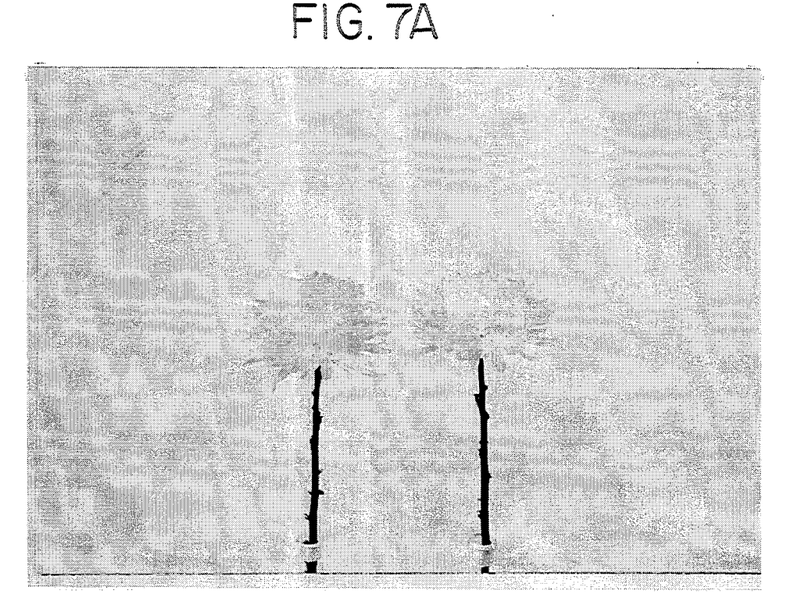
FIGS. 7A and 7B are photographs of chrysanthemums demonstrating the far infrared emission effect of the image display device manufactured through example 1 of the present invention.
Figure 7B:
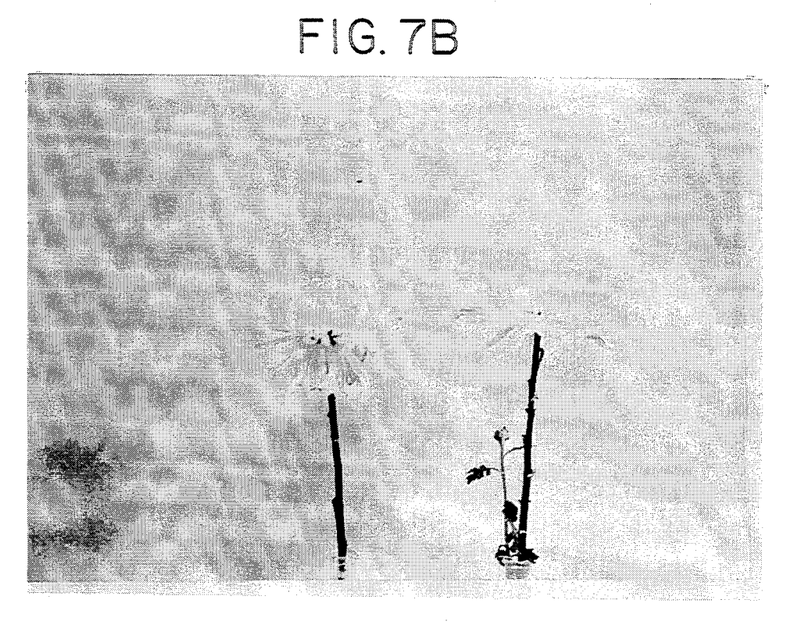

A 14" monitor is manufactured by employing the cabinet obtained through Example 2. FIG. 6 is a drawing for explaining the method of this experiment. In FIG. 6, a vase holding a flower is located on the cabinet. Here, two chrysanthemums blooming at the same extent are put into two vases, respectively. One vase is placed on a 14" monitor which employs the cabinet containing the far infrared emitting materials, and the other is placed on a 14" monitor which employs the same cabinet but does not contain far infrared emitting materials, as shown in FIG. 6. After leaving the flowers for 10 days while the monitors are operating, the changes in the two flowers are observed. FIG. 7A is a photograph of chrysanthemums taken before the monitor were turned on. It may be confirmed that the two flowers are blooming to the same extent. FIG. 7B is a chrysanthemum photograph taken after 10 days in which the left is the flower that was placed on the monitor employing the common cabinet and the right is the flower that was on the monitor employing the cabinet containing the far infrared emitting materials. In FIG. 7B, the flower that was on the monitor employing the cabinet which contains the far infrared emitting materials is still fresh and its leaves are growing. However, the flower that was on the monitor employing the ordinary cabinet is withering.

Another method for employing the far infrared emitting materials in such a the cabinet is by coating the materials on the inner or outer surface of the cabinet with a binder and/or sprayer.

EXAMPLE 3

5 wt % of the same far infrared emitting ceramic as in Example 1 is mixed with 95 wt % of acrylic binder. The mixture is coated on the outer surface of an ABS resin cabinet and heat dried to manufacture a far infrared emitting material coated cabinet.

EXAMPLE 4

3 wt % of the same far infrared emitting ceramic as in Example 1 is mixed with 96 wt % of vinyl chloride-based, heat sensitive binder. To the mixture, a small amount of a surfactant and polyvinyl alcohol is added and homogeneously mixed. The mixture is coated on the inner surface of an ABS resin cabinet and heat dried at 40° to 50° C. to manufacture a far infrared emitting material coated cabinet.

EXAMPLE 5

25 wt % of the same far infrared emitting ceramic as in Example 2 is mixed with 50 wt % of vinyl chloride resin, 15 wt % of acrylic ester-based plasticizer, 1 wt % of zinc-based stabilizer, 2 wt % of epoxy-based stabilizer and 7 wt % of acrylic binder. The mixture is coated on the inner and outer surface of an ABS resin cabinet and dried to manufacture a far infrared emitting material coated cabinet.

EXPERIMENT 2

Figure 8A:
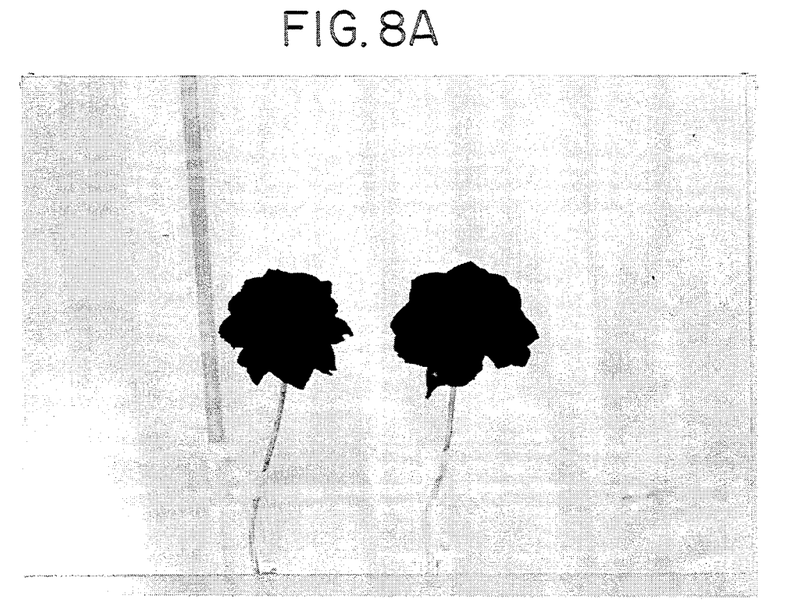
FIGS. 8A and 8B are photographs of roses demonstrating the far infrared emission effect of the image display device manufactured through example 2 of the present invention.
Figure 8B:
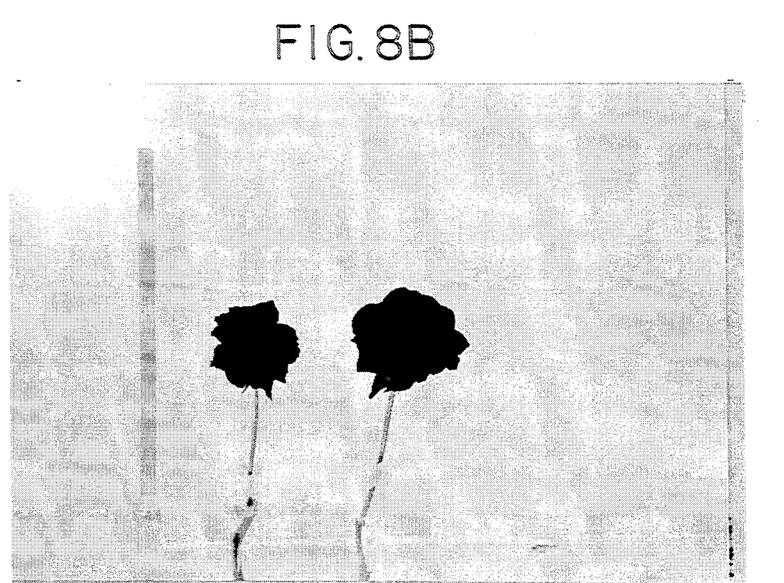

The effect of far infrared is demonstrated in the same manner as in Experiment 1 with 14″ monitors employing an ordinary cabinet and the far infrared emitting material coated cabinet manufactured through Example 5. Two roses blooming to the same extent are put into respective vases, and placed on each cabinet as shown in FIG. 6. The changes of the flowers are observed after turning the monitors on. FIG. 8A is a photograph taken after one day. In the photograph, the left flower was exposed to the ordinary monitor and the right flower was exposed to the monitor employing the cabinet containing the far infrared emitting material. The two flowers show no difference so far. FIG. 8B is a photograph taken after five days. From the photograph, it is confirmed that the flower exposed to the ordinary monitor is wilted and solidified, while that exposed to the monitor containing far infrared emitting material is still fresh.

As another embodiment of the present invention, there is provided a far infrared emitting image display device comprising a cabinet, characterized in that the cabinet includes at least one far infrared emitting lamp thereon.

It is preferred that a black far infrared emitting material is coated on the surface of the bulb so that the transmittance of visible rays is lowered and does not fatigue the user's eyes.

Also, it is preferred that a reflecting plate is provided to the rear of the bulb so that far infrared emission efficiency is increased. The most preferred is coating the far infrared emitting material on the surface of the reflecting plate so that far infrared emission efficiency is even further increased.

For the far infrared emitting materials, those used for manufacturing the cabinet can be employed. The preferred are silicon dioxide ($SiO_2$), aluminium oxide ($Al_2O_3$), manganese oxide (MnO), ferric oxide ($Fe_2O_3$), titanium oxide ($TiO_2$), zirconium oxide ($ZrO_2$) and magnesium oxide (MgO).

Further, it is preferred that a colored glass or a protector made of plastic is provided in order to protect the bulb and shield the light from the far infrared emitting lamp.

The temperature raised by the heat from the far infrared emitting lamp should be lower than the melting temperature of the cabinet constituting materials (commonly used ABS resin: 93° C.), and preferably be lower than 90° C. while maintaining the supplying power be lower than 20W.

For user convenience, the far infrared emitting lamps can be installed so that their direction is changeable according to the user's orientation, and are selectively lit up according to need.

Figure 9A:
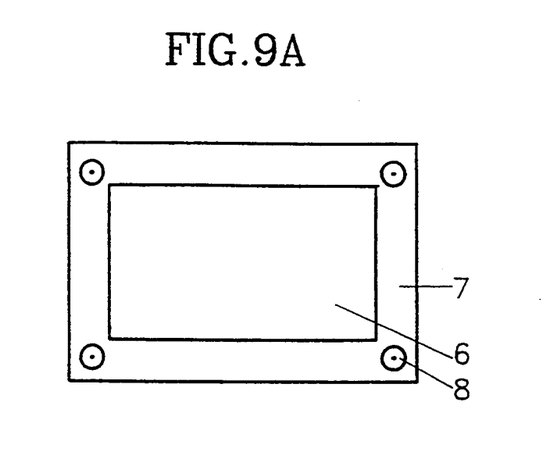
FIGS. 9A and 9B are a front view (9A) and a side view (9B) of the image display device according to the second embodiment of the present invention.
Figure 9B:
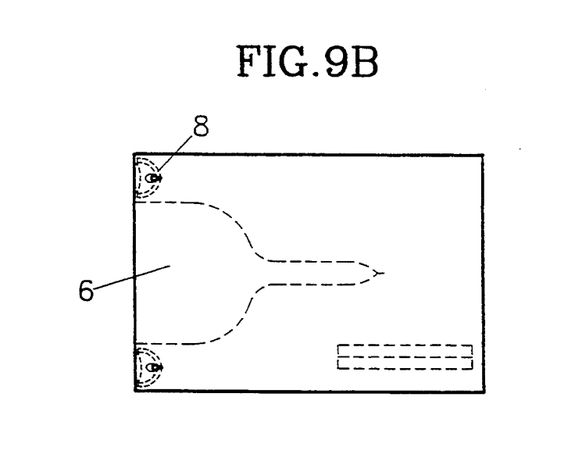

FIGS. 9A and 9B are a front view (9A) and a side view (9B) of the image display device according to this embodiment of the present invention. The device manufactured by installing far infrared emitting lamps 8 on the front of the cabinet 7. The reference numeral 6 denotes a cathode ray tube.

Figure 10:
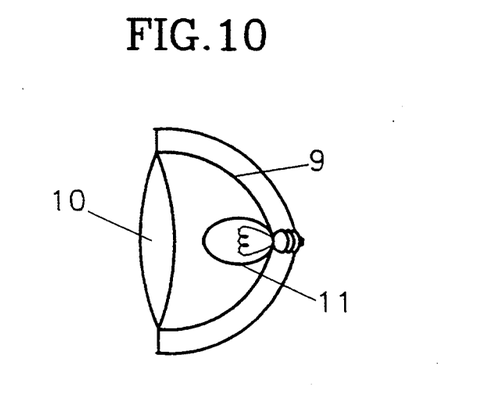
FIG. 10 is a longitudinal cross-sectional view of the far infrared emitting lamp which is preferably employed in the present invention.

FIG. 10 is a longitudinal cross-sectional view of the far infrared emitting lamp which is preferably employed in the present invention. A reflecting plate 9 is provided to the rear of the far infrared emitting bulb 11 and a protective cover 10 is provided on the front of cabinet 7.

Any lamp that can emit far infrared radiation such as an incandescent electric lamp, a halogen lamp, etc. can be employed as the far infrared emitting lamp. These all emit heat of their own accord. The emitted heat enhances the far infrared emission intensity. However, since too much heat might melt the cabinet material, the lamp capacity should be restricted and the temperature should not exceed 90° C. (The melting point of the commonly used ABS resin is 93° C.)

In order to prevent the user's eyes from being dazed by the emitted light, the bulb could be treated so as to have a black tinge, black far infrared emitting ceramic could be used, or a dark-colored protecting cover can be used. Any protecting cover that can partially shield the light and thus prevent it from being too bright can be employed.

Further, in order that the far infrared emitted forwardly and toward the user, and the rays are focused, a reflecting plate can be provided around the bulb as shown in FIG. 10.

It is preferred that one or more far infrared lamps be optionally provided to each image display device and each lamp be optionally lit according to the user's need. Of course, it is desirable that the lamp is designed so that the direction in which the rays are focused is freely adjustable according to the user's orientation, the chair height, the height of the user, etc.

The effect of the image display device employing the far infrared lamp is demonstrated by the following experiments.

EXPERIMENT 3

Figure 11A:
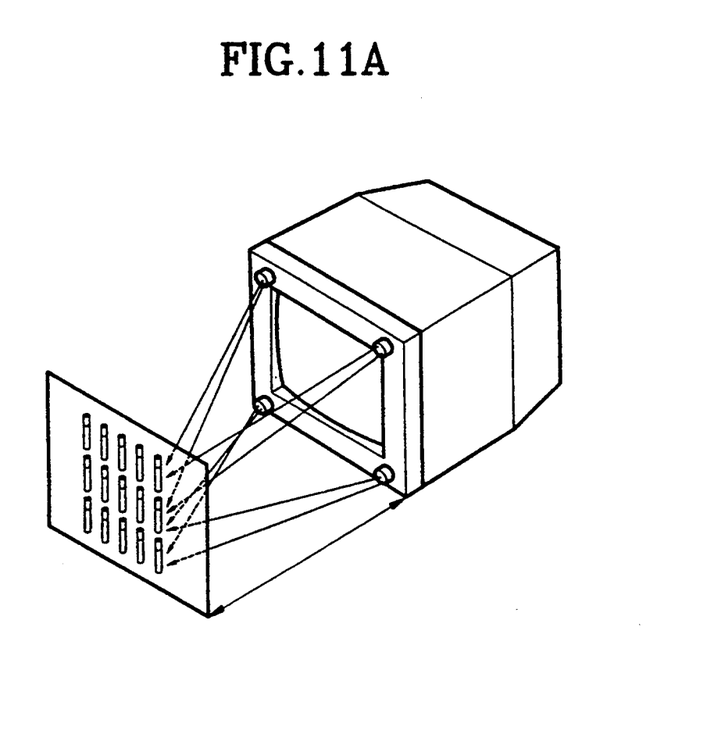
FIGS. 11A and 11B are drawings for explaining experiment 3 of the present invention.
Figure 11B:
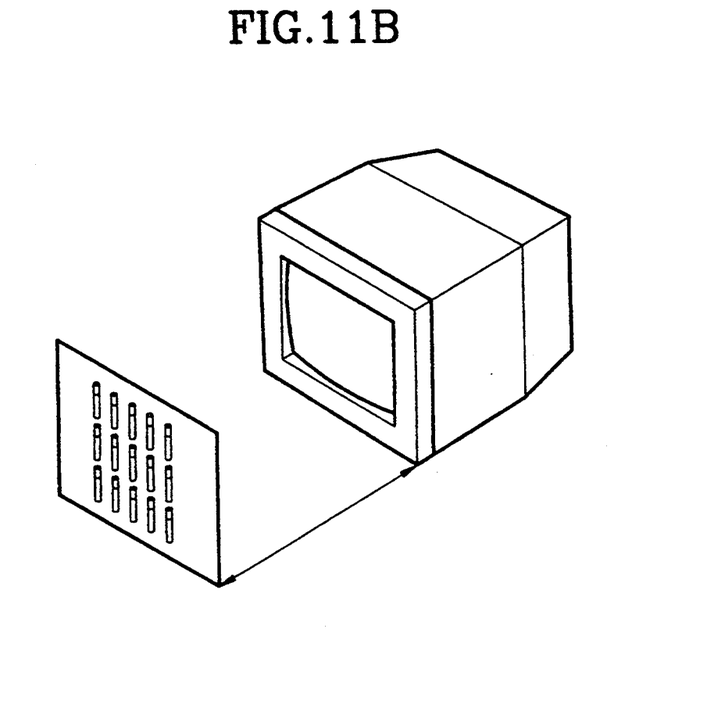

FIG. 11A illustrates a 14″ color monitor employing far infrared emitting lamps, and FIG. 11B illustrates a 14″ color monitor which does not employ a far infrared emitting lamp. Further details of the image display device employing the far infrared emitting lamps in FIG. 11A are as follows. The far infrared lamps are installed on the four corners of the front of the cabinet as illustrated in the drawings. The lamp is manufactured by coating the surface of an incandescent electric bulb with the mixture of metal oxides of silicon dioxide ($SiO_2$), aluminium oxide ($Al_2O_3$), manganese oxide (MnO) and ferric oxide ($Fe_2O_3$) with resin. The coating layer is black. On the surface of the reflection plate, a mixture of 20 wt % of far infrared ceramic with water glass is coated. The capacity of the incandescent bulb is 110V 7W, and the temperature of the bulb center reaches 70° C. 5 minutes after turning the bulb on. At a distance of 50 cm in front of the two monitors, cigarettes are located as illustrated in the drawings (room temperature 25° C., humidity 60% RH). After leaving the switches of the two image display devices turned on for 24 hours, a functional test of the taste of the cigarettes was carried out with 15 persons. After the functional test, all 15 persons considered the taste of the cigarettes receiving increased amounts of for infrared radiation was different from that of the cigarettes located in front of the conventional monitor, and 12 persons among these further judged the former to be milder than the latter.

EXPERIMENT 4

The far infrared lamp is installed in an image display device by the same method described in experiment 3. A far infrared emitting ceramic composed of silicon dioxide ($SiO_2$), aluminium oxide ($Al_2O_3$), titanium oxide ($TiO_2$) and magnesium oxide ($MgO$) is coated on the surface of the bulb. In this case, since the coating layer is near white, a protective cover is provided in order to reduce eye fatigue. The protective cover is made of colored glass having a transmittance of 43% at 560 nm.

Figure 12A:
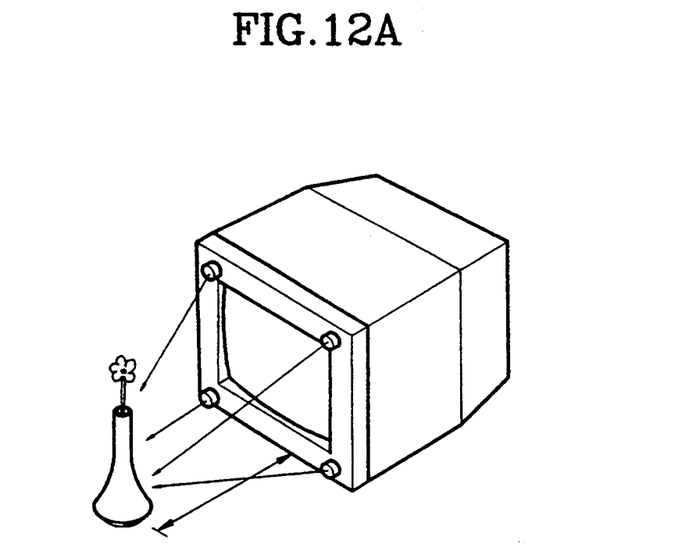
FIGS. 12A and 12B are drawings for explaining experiment 4 of the present invention.
Figure 12B:
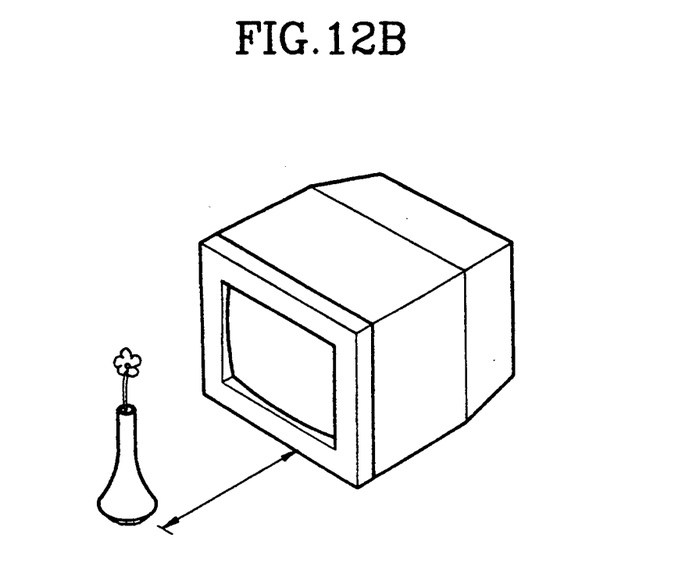

FIGS. 12A and 12B are drawings for explaining this experiment. In this experiment, two roses blooming at the same extent are put in front of a 14" color monitor employing a far infrared lamp and a common 14" color monitor, at a distance of 30 cm, and the change of the flowers are observed over time. The capacity of the far infrared lamp is 7.5W 120V, and the temperature of the bulb surface reaches 65° C. 5 minutes after turning the monitors on. The room temperature was 25° C. and the humidity was 65% RH.

In the course of the experiment, the rose exposed to the conventional monitor immediately withered owing to the electromagnetic waves emitted from the cathode ray tube and circuitry thereof. However, the rose exposed to the far infrared emitting monitor of the present invention remained in full bloom for a long time (about 6 days or longer) because the far infrared emitted from the device compensates for the damage owing to the harmful electromagnetic waves. This means that the far infrared emission activated water molecules, provided essential energy needed for growing the plant, and extended its freshness.

As the third embodiment, there is provided in the present invention a far infrared emitting image display device employing at least one far infrared emitting device for an image display device, which comprises far infrared emitting material, a heating means to apply heat to the far infrared emitting material, a reflecting plate to reflect far infrared radiation outwardly emitted from the interior of the device, and a supporting means including these objects.

As for the far infrared emitting materials, low-temperature, high-efficiency far infrared emitting materials which can emit far infrared in high efficiency at a low temperature such as aluminium oxides ($Al_2O_3$), silicon dioxides ($SiO_2$), zirconium oxides ($ZrO_2$), etc. are preferably used, so that they might not deform the supporting frame such as ABS resin, vinyl chloride-based resin, acrylic resin, etc.

In order to attach the far infrared emitting device to the image display device, an attaching means is required. This can be fixed through a binder or through the change of a molding design of the cabinet when manufacturing the image display device.

The present embodiment will be described in detail referring to the attached drawings below.

Figure 13A:
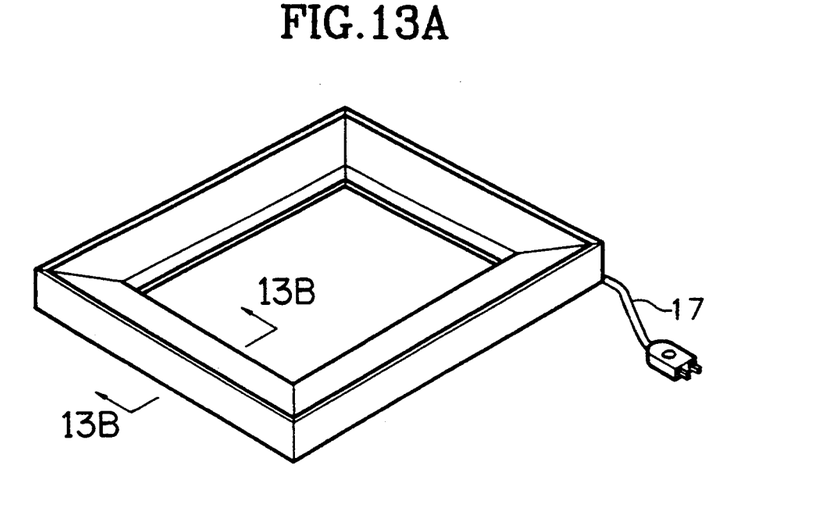
FIG. 13A is a perspective view of the device and FIG. 13B is a cross-sectional view cut along line 13B—13B of the device shown in FIG. 13A.
Figure 13B:
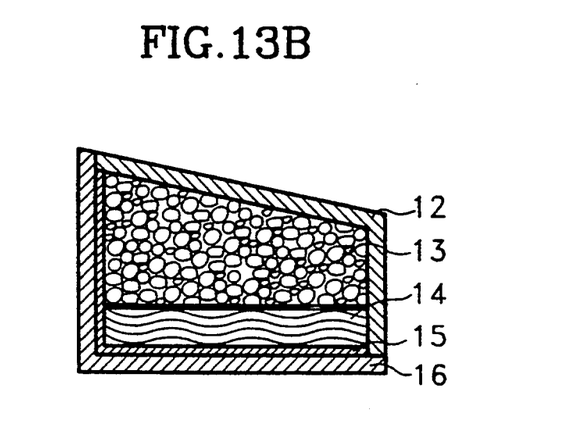

FIGS. 13A and 13B illustrate the basic structure of a far infrared emitting device according to this embodiment, in which FIG. 13A is a perspective view and FIG. 13B is a cross-sectional view of the device. As a supporting and containing means 16, a commonly used material for a cabinet case of an image display device, ABS resin is used and on the upper part, a reflecting plate 15 is provided. On the upper part of the reflecting plate 15, a heating means 14 is provided to increase far infrared emission. The applied heat should not exceed the temperature that might change the quality of this device; up to 50° C. is sufficient. On the upper part of the heating means, a far infrared emitting layer 13 manufactured by compacting, molding or coating far infrared emitting materials is prepared. As for far infrared emitting materials, low-temperature, high-efficiency far infrared emitting ceramics such as aluminium oxide, silicon dioxide, zirconium oxide, etc. are preferably employed.

The upper surface and the inner side of this far infrared emitting device is preferably provided with a transparent acryl layer 12 to maintain the efficiency of the far infrared emission. However, since a far infrared reflecting plate 15 and a heating means 14 are provided in the device, a layer made of an opaque ABS resin, vinyl chloride resin etc. shows a sufficiently good effect. The heater is connected to a source of electric power 17, exterior of the device.

The far infrared emitting device of this embodiment is designed so that this device may not shield the reproduced image of an image display device, and is attached to the front side of the cabinet or installed in the cabinet which has been designed and manufactured for installing this device. A cord to a source of electric power can be connected to an external source or can be drawn out to a circuit part in the cabinet and connected to it when fabricating the set.

Since the thus obtained image display device employing the far infrared emitting device on the front of the image display device emits far infrared, toward the place where an operator is located, the operator can largely receive the far infrared effect.

Figure 14A:
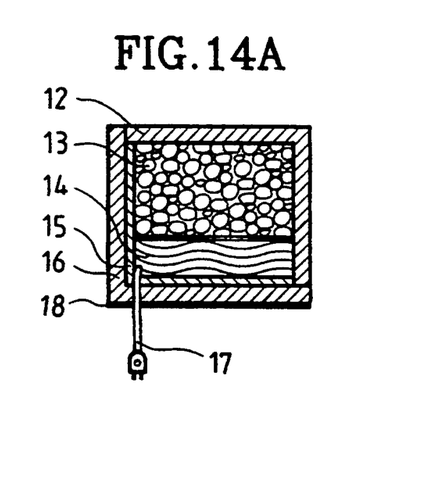
FIG. 14A is a cross-sectional view cut along line 14A–14A of the device shown in FIG. 15B illustrating another embodiment of the present invention and corresponding to FIG. 13B.
Figure 14B:
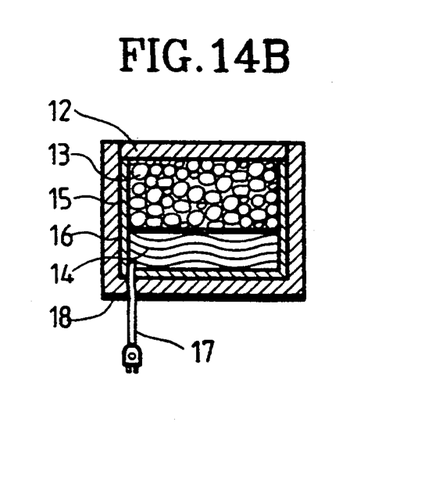
FIG. 14B is a cross-sectional view cut along line 14B—14B of the device shown in FIG. 15C which is a further another embodiment of the present invention.

FIGS. 14A and 14B illustrate other embodiments of the far infrared emitting devices (cross-sectional view) which have the same structure as the far infrared emitting device illustrated in FIG. 13B, but are a stick-type (FIG. 14A) and a cylinder-type (FIG. 14B), and they are manufactured to be used as required. The reference numeral 18 denotes a connecting means such as a binder.

Figure 15A:
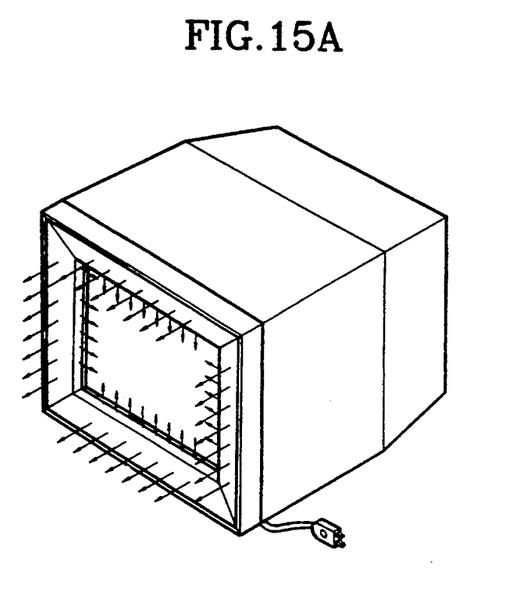
FIGS. 15A, 15B, and 15C illustrate the image display devices employing the far infrared emitting devices illustrated in FIGS. 13B, 14A and 14B, respectively.
Figure 15B:
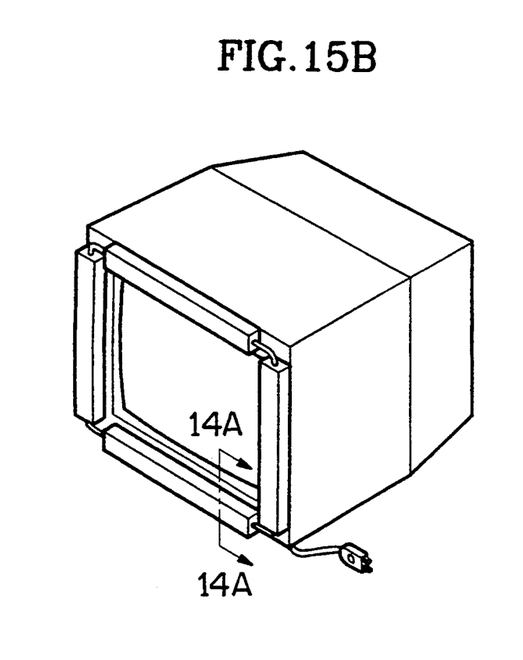
Figure 15C:
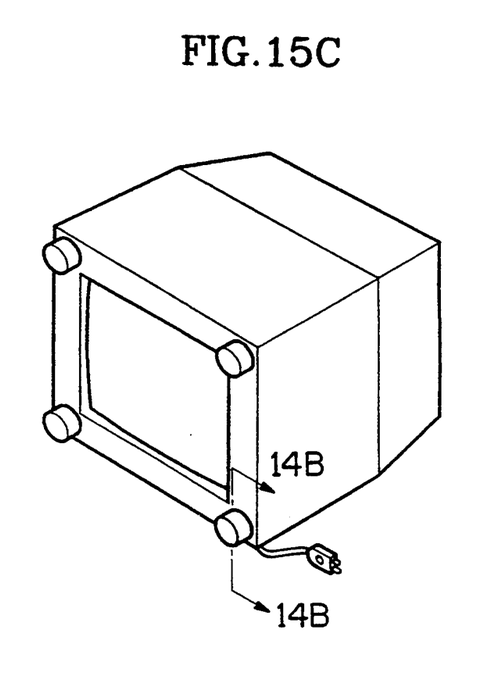

FIGS. 15A, 15B and 15C illustrate the image display devices employing the far infrared emitting devices illustrated in FIGS. 13B, 14A and 14B, respectively. These all emit far infrared radiation forward. In FIG. 15A, the arrows indicate the emitting direction of the far infrared rays.

To demonstrate the effect of the far infrared when employing the far infrared emitting device in the image display device, the following experiment was carried out.

EXPERIMENT 5

A far infrared emitting device as illustrated in FIG. 13A, is provided a 14" CDT (color display tube) as illustrated in FIG. 15A. A heater 14 is connected to a source of electric power and the far infrared emitting material is heated to 40° C. Two chrysanthemums blooming at the same extent are put in front of the 14" color monitor employing the far infrared emitting device and an ordinary 14" color monitor, both maintaining 30 cm distance. After turning the monitors on, the change of the flowers is observed over time, as illustrated in FIGS. 12A and 12B. Equal temperatures and other environmental factors were kept.

In this experiment, the two equally bloomed chrysanthemums showed distinct differences after seven days. The chrysanthemum that was located in front of the ordinary image display device withered more than that located in front of the image display device employing the far infrared emitting device. After fourteen days, the chrysanthemum that was located in front of the ordinary image display device almost completely withered. However, the chrysanthemum located in front of the image display device employing the far infrared emitting device kept fresh and its leaves began to bud.

As shown above, the far infrared emitting device can be simply attached to the image display device and can provide far infrared effects to users. This device is adaptable for practical use and can be manufactured into any shape.

As confirmed from the above examples and experiments, since the image display device containing the far infrared emitting source emits far infrared radiation which is beneficial to a living body, the users of these kind of devices can counterbalance the damage owing to harmful electromagnetic waves, and can receive vitality and energy from the far infrared radiation.

While the present image display device has been particularly shown and described with reference to particular embodiments thereof, it will be understood by those skilled in the art that various changes in form and details. For example, a television, computer monitor, LCD, PDP, etc. may be effected therein without departing from the spirit and scope of the invention as defined by the appended claims.

What is claimed is:

1. An image display device comprising an electronic information display and a cabinet containing said electronic information display, wherein at least a portion of said cabinet is formed from a mixture of raw materials and at least one far infrared emitting material in an amount of 1 to 30 wt %.

2. An image display device as claimed in claim 1, wherein said at least one far infrared emitting material is 5 to 15 wt % based on the raw materials for manufacturing said at least a portion of said cabinet.

3. An image display device as claimed in claim 1, wherein said at least one far infrared emitting material is at least one material selected from the group consisting of aluminium oxide ($Al_2O_3$), silicon dioxide ($SiO_2$), magnesium oxide (MgO), zirconium oxide ($ZrO_2$), carbonates, ferric oxide ($Fe_2O_3$), manganese dioxide ($MnO_2$), cupric oxide (CuO), tricobalt tetroxide ($Co_3O_4$), nickel monoxide (NiO), chromic oxide ($Cr_2O_3$), titanium oxide ($TiO_2$), boron oxide ($B_2O_3$), sodium oxide ($Na_2O$), potassium oxide ($K_2O$), molybdenum sesquioxide ($Mo_2O_3$), calcium oxide (CaO), lithium oxide ($Li_2O$), zinc oxide (ZnO), bismuth oxide ($Bi_2O_3$), phosphorous pentoxide ($P_2O_5$), barium oxide (BaO) and complexes thereof.

4. An image display device comprising an electronic information display and a far infrared lamp at the frontside of a cabinet containing said electronic information display.

5. An image display device as claimed in claim 4, wherein said far infrared lamp further comprises a reflecting plate behind a far infrared emitting bulb.

6. An image display device as claimed in claim 5, wherein said reflecting plate is coated with far infrared emitting materials on the surface of said plate.

7. An image display device as claimed in claim 4, wherein the surface of said bulb of said far infrared lamp is coated with a black far infrared emitting material.

8. An image display device as claimed in claim 4, wherein said far infrared emitting material is at least one member selected from the group consisting of silicon dioxide ($SiO_2$), aluminium oxide ($Al_2O_3$), manganese oxide (MnO), manganese dioxide ($MnO_2$), ferric oxide ($Fe_2O_3$), cupric oxide (CuO), tricobalt tetroxide ($Co_3O_4$), nickel monoxide (NiO), chromic oxide ($Cr_2O_3$), boron oxide ($B_2O_3$), sodium oxide ($Na_2O$), potassium oxide ($K_2O$), molybdenum sesquioxide ($Mo_2O_3$), calcium oxide (CaO), lithium oxide ($Li_2O$), zinc oxide (ZnO), bismuth oxide ($Bi_2O_3$), phosphorous pentoxide ($P_2O_5$), barium oxide (BaO), titanium oxide ($TiO_2$), zirconium oxide ($ZrO_2$) and magnesium oxide (MgO).

9. An image display device as claimed in claim 4, wherein said far infrared lamp further comprises a protecting cover made of colored glass or plastic.

10. An image display device as claimed in claim 4, wherein the supplying power is lower than 20W and the temperature raised by the heat from the far infrared emitting lamp is lower than 90° C.

11. An image display device as claimed in claim 4, wherein said far infrared lamp is installed so that the direction of said lamps is changeable according to the orientation of the user.

12. An image display device as claimed in claim 4, wherein said far infrared lamp is installed so as to be selectively lit up according to need.

13. An image display device comprising an electronic information display and at least one far infrared emitting device containing a heater to apply heat to a far infrared emitting material, a reflecting plate to reflect far infrared radiation which is outwardly emitted from the interior of said far infrared emitting device, and a supporting means for supporting at least one far infrared emitting device and said reflecting plate.

14. An image display device as claimed in claim 13, wherein said far infrared emitting material is at least one selected from the group consisting of aluminium oxide ($Al_2O_3$), silicon dioxide ($SiO_2$), zirconium oxide ($ZrO_2$), magnesium oxide (MgO), carbons, ferric oxide ($Fe_2O_3$), manganese dioxide ($MnO_2$), cupric oxide (CuO), tricobalt tetroxide ($Co_3O_4$), nickel monoxide (NiO), chromic oxide ($Cr_2O_3$), titanium oxide ($TiO_2$), boron oxide ($B_2O_3$), sodium oxide ($Na_2O$), potassium oxide ($K_2O$), molybdenum sesquioxide ($Mo_2O_3$), calcium oxide (CaO), lithium oxide ($Li_2O$), zinc oxide (ZnO), bismuth oxide ($Bi_2O_3$), phosphorous pentoxide ($P_2O_5$), barium oxide (BaO) and a complex thereof.

15. An image display device as claimed in claim 13, wherein said supporting means is made of at least one material selected from the group consisting of ABS resin, vinyl chloride-based resin and acryl resin.

16. An image display device as claimed in claim 13, wherein said far infrared emitting device further comprises a connecting means for its connection to said image display device.

17. An image display device as claimed in claim 16, wherein said connecting means is a binder.

18. A housing for an image display device comprising a cabinet having an opening for viewing an electronic information display accommodated in said cabinet, wherein at least a portion of said cabinet is formed from a mixture of raw materials and at least one far infrared emitting material in an amount of 1 to 30%, by weight.

19. A housing for an image display device comprising a cabinet having an opening for viewing an electronic information display accommodated in said cabinet, wherein said cabinet includes on a front viewing side thereof at least one for infrared lamp.

* * * * *

UNITED STATES PATENT AND TRADEMARK OFFICE
CERTIFICATE OF CORRECTION

PATENT NO. :     5,444,261
DATED      :     August 22, 1995
INVENTOR(S) :    Kim It is certified that error appears in the above-indentified patent and that said Letters Patent is hereby corrected as shown below:

Column 12, Line 67, change "for" to --far--.

Signed and Sealed this

Ninth Day of January, 1996

Attest:

BRUCE LEHMAN

*Attesting Officer*     *Commissioner of Patents and Trademarks*